United States Patent [19]

Armand et al.

[11] Patent Number: 4,620,944

[45] Date of Patent: Nov. 4, 1986

[54] MACROMOLECULAR MATERIAL OF IONIC CONDUCTION FOR PRODUCING ELECTROLYTES OR ELECTRODES

[75] Inventors: Michel Armand, Echirolles; Daniel Muller; Jean-Michel Chabagno, both of Pau, all of France

[73] Assignees: Societe Nationale Elf Aquitaine, Courbevoie, France; Hydro-Quebec, Quebec, Canada

[21] Appl. No.: 739,057

[22] Filed: May 29, 1985

[30] Foreign Application Priority Data

May 29, 1984 [FR] France ................................ 84 08417

[51] Int. Cl.$^4$ ............................................. H01B 1/06
[52] U.S. Cl. ..................... 252/518; 252/62.2; 252/521; 524/401; 524/610; 524/857; 524/859; 525/409; 528/4; 528/29; 528/76; 528/395
[58] Field of Search ...................... 252/62.2, 518, 521; 524/590, 610, 857, 859, 858, 401; 525/403, 409; 528/29, 4, 76, 395

[56] References Cited

U.S. PATENT DOCUMENTS

| | | | |
|---|---|---|---|
| 3,625,684 | 12/1971 | Poot et al. | ..................... 525/403 X |
| 4,091,022 | 5/1978 | Etchlls . | |
| 4,200,701 | 4/1980 | Wetton et al. | ................. 528/419 X |
| 4,303,748 | 2/1981 | Armand et al. . | |

FOREIGN PATENT DOCUMENTS 7917565  5/1980  France .
0037776 10/1981  France .

*Primary Examiner*—Earl Nielsen
*Attorney, Agent, or Firm*—Oblon, Fisher, Spivak, McClelland & Maier

[57] ABSTRACT

Macromolecular material of ionic conduction constituted by a salt in solution in a polyether. The polyether is polycondensed and/or cross-linked and presents at least two chains connected to each other by a bridge that comprises a silicon, cadmium, boron or titanium atom connected to one of the chains by an oxygen atom.

Application to producing electrodes and electrolytes for electrochemical accumulators.

13 Claims, No Drawings

MACROMOLECULAR MATERIAL OF IONIC CONDUCTION FOR PRODUCING ELECTROLYTES OR ELECTRODES

BACKGROUND OF THE INVENTION

1. Field of the Invention

The present invention relates to a novel ionically conductive macromolecular material used for electrolytes or electrodes. It concerns, in particular, materials which are present in the form of a polyether-salt based network and/or polycondensate.

2. Discussion of the Background

Such ironically conductive macromolecular materials are either not crystalline, or only very slightly crystalline, at ambient temperature. Therefor it is practically impossible to utilize them to produce electrochemical current generators, whether they be primary or secondary.

According to the prior art, solid electrolytes constituted by solid solutions of ionic compounds in polymers are already known. Reference may be made, for example, to European Pat. No. 0 013 199, entitled "Générateurs électrochimiques de production de courant et nouveaux matériaux pour leur fabrication which describes solid solutions of lithium salts in polar aprotic solutions capable of solvating the cation. These solutions constitute solid electrolytes that can be utilized in thin layers in solid generators. Among the polymers cited in this European patent ethylene polyoxides, propylene polyoxides and their copolymers are cited in particular.

In order to improve the mechanical properties of the electrolytes thereby constituted, and their behaviour with respect to crystallization, French patent application published under No. 2 485 274 entitled "Electrolyte solid à base de matériau macromoléculaire à conduction ionique" proposes to utilize as the electrolyte a cross-linked polymer complex material. The cross-linking is carried out with polymers containing hydroxyl functions that can be cross-linked by isocyanates, which leads to urethane networks in which the said functions are capable of reacting with the elements of the anode and/or the cathode and thus to provoke on the one hand a degradation of the polymer which could thus no longer fulfill its role of elastomer binder, and parallely on the other hand the consumption of a portion of the cathode or anode materials through irreversible oxidation.

The products obtained according to this cross-linking method present, due to the large dimension of the knots or meshes of the network initiated by the isocyanates, a high volumic (or massic) percentage of non solvating portion of the cation that can hinder the dissolutions and/or the dissociation of the salt, thereby causing a decrease in conductivity. If it is desired to overcome this poor solvation, it is possible to increase the molecular weight of the functional starting polymer but this generally leads to a decrease in the ionic conductivity of the polyether-salt complex through crystallization at low temperature.

SUMMARY OF THE INVENTION

On the contrary, the invention provide a macromolecular material made up of a polyether network salt in which the knots or meshes of the network are small-sized and correspond to cross-linking agents favoring the lowest possible vitreous transition temperature, the said material presenting a large range of redox stability. Furthermore, this material presents the advantage of being virtually free from protons after cross-linking.

In order to do this, the invention foresees the use of metallic or metalloidic derivates to obtain networks containing bonds of the R-O-M type, in which R represents a polyether and M a metal or a metalloid being at least divalent.

Therefore, the present invention concerns a macromolecular material presenting ionic conduction constituted by a salt in solution in a macromolecular material that is constituted by a least two polyether chains connected to each other by an atomic bridge. The bridge comprises at least one atom selected from among silicon, cadmium, boron and titanium). This atom is connected to at least one of the chains by an oxygen atom.

DETAILED DESCRIPTION OF THE PREFERRED EMBODIMENTS

Preferably, the atom is a silicon atom and it is connected to each of the polyether chains through the intermediary of an oxygen atom.

In another preferred example, the said macromolecular material is made up of at least three polyether chains connected between one another by a an atomic bridge and the said bridge comprises at least one silicon atom connected to each of the said three chains by an oxygen atom.

According to another feature of the invention, each of the said chains has a molecular weight of between 250 and 30,000.

To obtain macromolecular materials according to the invention, it is possible to utilize the process in which at least one polyetherglycol, and/or one of its metallic salts, mono or polydispersed, which may be pure or in a mixture with at least one other polyetherglycol, is reacted with at least one cross-linking agent or at least condensation agent. The said polyetherglycol that is caused to react corresponds to the polyether chains mentioned herein-above. The said cross-linking or condensation agent comprises at least one atom of a metal or a metalloid which is at least divalent, chosen from among silicon, cadmium, boron and titanium. The said reaction occurs in solution in the said macromolecular material.

By the expression "mono or polydispersed" it is meant that it is possible to have polyetherglycols or the same molecular weight or of different molecular weights.

Preferably, the process consists, furthermore, in spreading the mixture while the reaction is in progress so as to obtain a thin layer.

According to a first embodiment of this process, the said reaction is carried out with at most a stoichiometric quantity of a halogen or pseudohalogen derivate represented by the formula:

in which:
R' represents an alkyl radical, preferably methyl;
x represents the number of radical R';
X is a halogen or pseudohalogen such as $SCN^-$;
M is a metal or metalloid, at least divalent, selected from among silicon, cadmium, boron and titanium;
n is the valency of M with $n - x \geq 2$ According to a second embodiment, the process consists in carrying out a transetherification through reaction of polyetherglycols on light alkoxides of the said metal or metalloid, represented by the formula R''-O-M in which R'' is an alkyl radical of from 1 to 8 carbon atoms and M has the same signification as given herein-above.

According to a third embodiment, the process consists in carrying out a polycondensation on polyetherglycols in the presence of boric acid $B(OH)_3$.

However the invention also concerns composite electrodes produced from macromolecular material described herein-above. These electrodes can be obtained according to embodiments described, it is sufficient that the initial mixture comprises, in the form of powder, the active compound of the said electrode.

The interest of the manufacturing process for macromolecular materials according to the invention for manufacturing electrolytes or electrodes lies essentially in the fact that the reaction can occur at ambient temperature and thus can present a sufficiently slow kinetic rate to permit easy spreading out of the product in a thin layer.

In the case where the reaction is carried out from polyols, the reaction rate is perfectly controllable through the elimination of the hydracid formed. This elimination can be favorized by an increase of the temperature or can occur under vacuum, in the presence of a compound capable of fix the hydracide and which is neutral with respect to the electrochemical chain of the generator.

In the case where the startng mixture contains polyglycol metallic salts, alkaline metal halogenides are formed with precipitate in the reactional medium or can, according to their nature, be put into solution in the polyether formed and thus contribute to the increase of the ionic conduction.

In order to render more apparent the features, objects and advantages of the present invention, the following examples are given by way of non-limitative illustration.

DESCRIPTION OF PREFERRED EMBODIMENTS

In these examples the conductivities of the materials obtained with the prior art (cross-linking of the tri-isocyanates) are compared with the conductivities of the materials obtained according to the invention.

1. Study of a material obtained from an polyethylene glycol, of MW 3000, into which is put into solution lithium perchlorate $LiClO_4$ with a $O/Li = 12$ ratio.

Prior art: the polyoxyethyleneglycol (POEG) is cross-linked in the presence of a stoichiometric quantity of aliphatic triisocyanate, in the presence of amine as catalyst and in solution in acetonitrile presenting a dry extract of 70%.

Invention: the reaction is carried out in acetonitrile and in the presence of $CH_3SiCl_3$. The product is cross-linked without catalyst in 10 mn at ambient temperature (25° C.).

At the end of the reaction, the product is spread out on a support, the reaction is thus completed by raising the temperature. It is then drawn out so as to obtain a thin film. The $CH_3SiCl_3$ was present in a stoichiometric quantity with respect to the initial polyetherglycol. The temperatures are measured as well as the conductivity for which values are obtained, in $\Omega^{-1} cm^{-1}$: $10^{-6}$, $10^{-5}$ and $10^{-4}$. The results obtained are tabulated in the following table I.

TABLE I

| POEG 3000 Stoichiometric | | | | | | |
|---|---|---|---|---|---|---|
| tri-isocyanates | | | $CH_3 Si Cl_3$ | | | |
| $\Omega^{-1} cm^{-1}$ | $10^{-6}$ | $10^{-5}$ | $10^{-4}$ | $10^{-6}$ | $10^{-5}$ | $10^{-4}$ |
| $\theta$ (°C.) | 38 | 48 | 90 | 24 | 40 | 80 |

It will be observed from this table that the temperatures have been decreased by about 24° to 10° C. which means that the conductivity has been increased.

2. Study of the same materials but obtained with a quantity lower than the stoichiometric (10%) of the isocyanate and methyltrichlorosilane ($CH_3SiCl_3$).

The results obtained are compiled in table II.

TABLE II

| POEG 3000 Stoichiometric less 10% | | | | | | |
|---|---|---|---|---|---|---|
| tri-isocyanates | | | $CH_3 Si Cl_3$ | | | |
| $\Omega^{-1} cm^{-1}$ | $10^{-6}$ | $10^{-5}$ | $10^{-4}$ | $10^{-6}$ | $10^{-5}$ | $10^{-4}$ |
| $\theta$ (°C.) | 36 | 55 | 85 | 20 | 35 | 65 |

It will be observed in this table that the conductivity has been strongly increased although starting from a lower stoichiometry.

3. The same comparative study was made but starting from a polyetherglycol mixture made of:
80% (by weight) polyethylene glycol
20% (by weight) polypropyleneglycol (PPG)
comprising in solution $LiClO_4$ with the $O/Li = 12$ ratio carried out after putting into solution in the acetonitrile with a dry extract of 50%.

The results obtained are compiled in table III where the molecular weights are also indicated.

TABLE III

| POEG MW = 6000 80% weight PPG MW = 3000 20% weight | | | | | | |
|---|---|---|---|---|---|---|
| tri-isocyanates | | | $CH_3 Si Cl_3$ | | | |
| $\Omega^{-1} cm^{-1}$ | $10^{-6}$ | $10^{-5}$ | $10^{-4}$ | $10^{-6}$ | $10^{-5}$ | $10^{-4}$ |
| $\theta$ (°C.) | 30 | 50 | 95 | 21 | 40 | 70 |

We claim:

1. An ionically conductive material comprised of a salt in solution in a macromolecular material, said macromolecular material comprising at least two polyether chains connected to each other via an atomic bridge, said atomic bridge being at least one member selected from the group consisting of silicon, cadmium, boron and titanium atoms.

2. The ionically conductive material of claim 1, wherein the said atomic bridge is bound to an oxygen atom of at least one of the said polyether chains.

3. The ionically conductive material of claim 1, wherein the said atomic bridge is a silicon atom bound to an oxygen atom of each of the said polyether chains.

4. The ionically conductive material of claim 1, wherein the said macromolecular material comprises at least three polyether chains connected to each other by at least one silicon atom bound to each of the said three polyether chains via an silicon-oxygen bond.

5. The ionically conductive material of claim 1, wherein the said polyether chain is a homopolymer or a copolymer.

6. The ionically conductive of claim 1, wherein the said polyether chain is an ethylene oxide-containing copolymer.

7. The ionically conductive material of one of claims 5 or 6, wherein the said polyether chains are identical.

8. The ionically conductive material of claim 5, wherein the said polyether chains have a molecular weight of between 250 and 30,000.

9. The ionically conductive material of claim 1, wherein the said macromolecular material is obtained by the reaction of a polyether glycol with at least one cross-linking or condensing agent,
wherein the said polyether glycol is in free or metallic salt form, is mono or poly dispersed, and is pure or mixed with at least one other polyether glycol, and wherein the said agent contains at least one atom of a metal or an at least divalent metalloid which is chosen from the group consisting of silicon, cadmium, boron and titanium, and wherein the said reaction takes place in the presence of a salt to be put into solution in the said macromolecular material.

10. The ionically conductive material of claim 9, wherein the said agent is present in at most a stoichiometric quantity and comprises a halogen or a psuedohalogen derivative of the formula:

$$R'_x MX_{(n-x)}$$

wherein:
R' represents an alkyl radical;
x represents the number of radicals R';
X is the halogen or pseudohalogen;
M is the metal or the at least divalent metalloid;
n is the valency of M with the condition that n−x is less than or equal to 2.

11. The ionically conductive material of claim 10, wherein R' is methyl.

12. The ionically conductive material of claim 9, wherein the said reaction is a transesterification reaction run in the presence of a light alkoxide of the said metal represented by the formula R''-O-M in which R'' is an alkyl radical having from 1 to 8 carbon atoms, and M is the metal or the at least bivalent metalloid.

13. The ionically conductive material of claim 9, wherein the said reaction is a transesterification reaction and the atomic bridge is a boric acid compound.

* * * * *